US012751345B2

(12) United States Patent
Ishikawa

(10) Patent No.: US 12,751,345 B2
(45) Date of Patent: Oct. 6, 2026

(54) AUTOMATIC TRAVELING METHOD, AUTOMATIC TRAVELING SYSTEM, AND AUTOMATIC TRAVELING PROGRAM

(71) Applicant: Yanmar Holdings Co., Ltd., Osaka (JP)

(72) Inventor: Akira Ishikawa, Okayama (JP)

(73) Assignee: Yanmar Holdings Co., Ltd., Osaka (JP)

( * ) Notice: Subject to any disclaimer, the term of this patent is extended or adjusted under 35 U.S.C. 154(b) by 614 days.

(21) Appl. No.: 17/899,640

(22) Filed: Aug. 31, 2022

(65) Prior Publication Data

US 2023/0064728 A1 Mar. 2, 2023

(30) Foreign Application Priority Data

Sep. 1, 2021 (JP) ................................ 2021-142201

(51) Int. Cl.
*A01B 69/04* (2006.01)
*A01B 63/02* (2006.01)
*G05D 1/00* (2024.01)

(52) U.S. Cl.
CPC ............ *A01B 69/008* (2013.01); *A01B 63/02* (2013.01); *G05D 1/0223* (2013.01)

(58) Field of Classification Search
CPC ..... A01B 69/008; A01B 63/02; G05D 1/0223
See application file for complete search history.

(56) References Cited

U.S. PATENT DOCUMENTS

2021/0064050 A1* 3/2021 Pickett ................ G05D 1/0044
2021/0064060 A1* 3/2021 Park .................... G05D 1/0295
2022/0167543 A1* 6/2022 Bast ........................ G05D 1/65
2022/0374020 A1* 11/2022 Tahiliani ............... G05D 1/661

* cited by examiner

*Primary Examiner* — Aaron L Troost
(74) *Attorney, Agent, or Firm* — Chris Mizumoto

(57) ABSTRACT

On a straight route, a traveling processor sets a work instrument to a working posture, and causes the work vehicle to travel at a first traveling speed. In a turn route connecting to a straight route, the traveling processor sets the work instrument to the non-working posture, and caused the work vehicle to travel at a second driving speed lower than the first traveling speed. In a partial route from an end position of a turn route to a predetermined position, the traveling processor causes the work instrument to change from the non-working posture to the working posture, and causes the work vehicle to travel at a third traveling speed lower than the first traveling speed.

12 Claims, 7 Drawing Sheets

AUTOMATIC TRAVELING METHOD, AUTOMATIC TRAVELING SYSTEM, AND AUTOMATIC TRAVELING PROGRAM

CROSS-REFERENCE

This application claims foreign priority of JP2021-142201 filed Sep. 1, 2021, the disclosure of which is hereby incorporated by reference in its entirety.

TECHNICAL FIELD

The present invention relates to an automatic traveling method, an automatic traveling system, and an automatic traveling program for automatically traveling a work vehicle that performs a predetermined work by a work instrument.

BACKGROUND ART

Conventional systems are known to cause a work vehicle to automatically travel in a field while having it perform a predetermined work. For example, the work vehicle is equipped with a rotary (work instrument) that can be raised and lowered, and the system lowers the rotary on the work route to cultivate the soil while the work vehicle automatically travels along the target route (see, for example, Patent Document 1).

PRIOR ART DOCUMENT

Patent Document

Patent Document 1: Japanese Unexamined Patent Application Publication No. 2020-103183

SUMMARY OF INVENTION

Technical Problem

Here, the above rotary is lowered in the work route (e.g., straight route) where cultivating work is performed, and the cultivating work is performed by piercing the cultivating tines into the ground, and is raised in the non-work route (e.g., turn route) where no cultivating work is performed. For example, while the work vehicle is traveling in a turning manner, the rotary is in the raised position, and when the work vehicle finishes traveling in a turning manner, the rotary starts lowering. While the rotary is lowered, the work vehicle automatically travels on the straight route. In this case, the work vehicle travels a predetermined distance before the cultivating tines of the rotary reach a predetermined depth in the ground, so the traveled portion of the predetermined distance is not properly cultivated, resulting in poor work (residual cultivation). Thus, in the case of the work instrument that switches between a working posture (working posture) and a non-working posture (non-working posture), the conventional technology has a problem in which work defects occur when switching the postures.

An object of the present invention is to provide an automatic traveling method, an automatic traveling system, and an automatic traveling program capable of suppressing a work defect in a work vehicle equipped with a work instrument capable of switching between working and non-working postures.

Solution to Problem

An automatic traveling method according to the present invention is a method that causes a work vehicle to automatically travel, in a work area, according to a target route, the work vehicle being equipped with a work instrument capable of switching between a working posture in which a predetermined work is performed, and a non-working posture in which the predetermined work is not performed. The automatic traveling method executes: in a first work route included in the target route, setting the work instrument to the working posture, and causing the work vehicle to travel at a first traveling speed; in a non-work route connecting to the first work route included in the target route, setting the work instrument to the non-working posture, and causing the work vehicle to travel at a second traveling speed lower than the first traveling speed; and of a second work route connecting to the non-work route included in the target route, in a first partial route from a connection position of the non-work route and the second work route to a predetermined position, causing the work instrument to change from the non-working posture to the working posture, and causing the work vehicle to travel at a third traveling speed lower than the first traveling speed.

An automatic traveling system according to the present invention is a system that causes a work vehicle to automatically travel, in a work area, according to a target route, the work vehicle being equipped with a work instrument capable of switching between a working posture in which a predetermined work is performed, and a non-working posture in which the predetermined work is not performed. The automatic traveling system includes a first traveling processor; a second traveling processor; and a third traveling processor. The first traveling processor, in a first work route included in the target route, sets the work instrument to the working posture, and causes the work vehicle to travel at a first traveling speed. The second traveling processor, in a non-work route connecting to the first work route included in the target route, sets the work instrument to the non-working posture, and causes the work vehicle to travel at a second traveling speed lower than the first traveling speed. The third traveling processor, of a second work route connecting to the non-work route included in the target route, in a first partial route from a connection position of the non-work route and the second work route to a predetermined position, causes the work instrument to change from the non-working posture to the working posture, and causes the work vehicle to travel at a third traveling speed lower than the first traveling speed.

An automatic traveling program according to the present invention is a program that causes a work vehicle to automatically travel, in a work area, according to a target route, the work vehicle being equipped with a work instrument capable of switching between a working posture in which a predetermined work is performed, and a non-working posture in which the predetermined work is not performed. The automatic traveling program is a program that causes one or a plurality of processors to execute an operation that includes: in a first work route included in the target route, setting the work instrument to the working posture, and causing the work vehicle to travel at a first traveling speed; in a non-work route connecting to the first work route included in the target route, setting the work instrument to the non-working posture, and causing the work vehicle to travel at a second traveling speed lower than the first traveling speed; and of a second work route connecting to the non-work route included in the target route, in a first partial route from a connection position of the non-work route and the second work route to a predetermined position, causing the work instrument to change from the non-working posture to the working posture, and causing the work vehicle to travel at a third traveling speed lower than the first traveling speed.

Advantageous Effects of Invention

According to the present invention, it is possible to provide an automatic traveling method, an automatic traveling system, and an automatic traveling program that can suppress work defects in a work vehicle equipped with a work instrument that can switch between working and non-working postures.

DESCRIPTION OF EMBODIMENTS

The following embodiments are embodied examples of the present invention and are not intended to limit the technical scope of the present invention.

Figure 1:
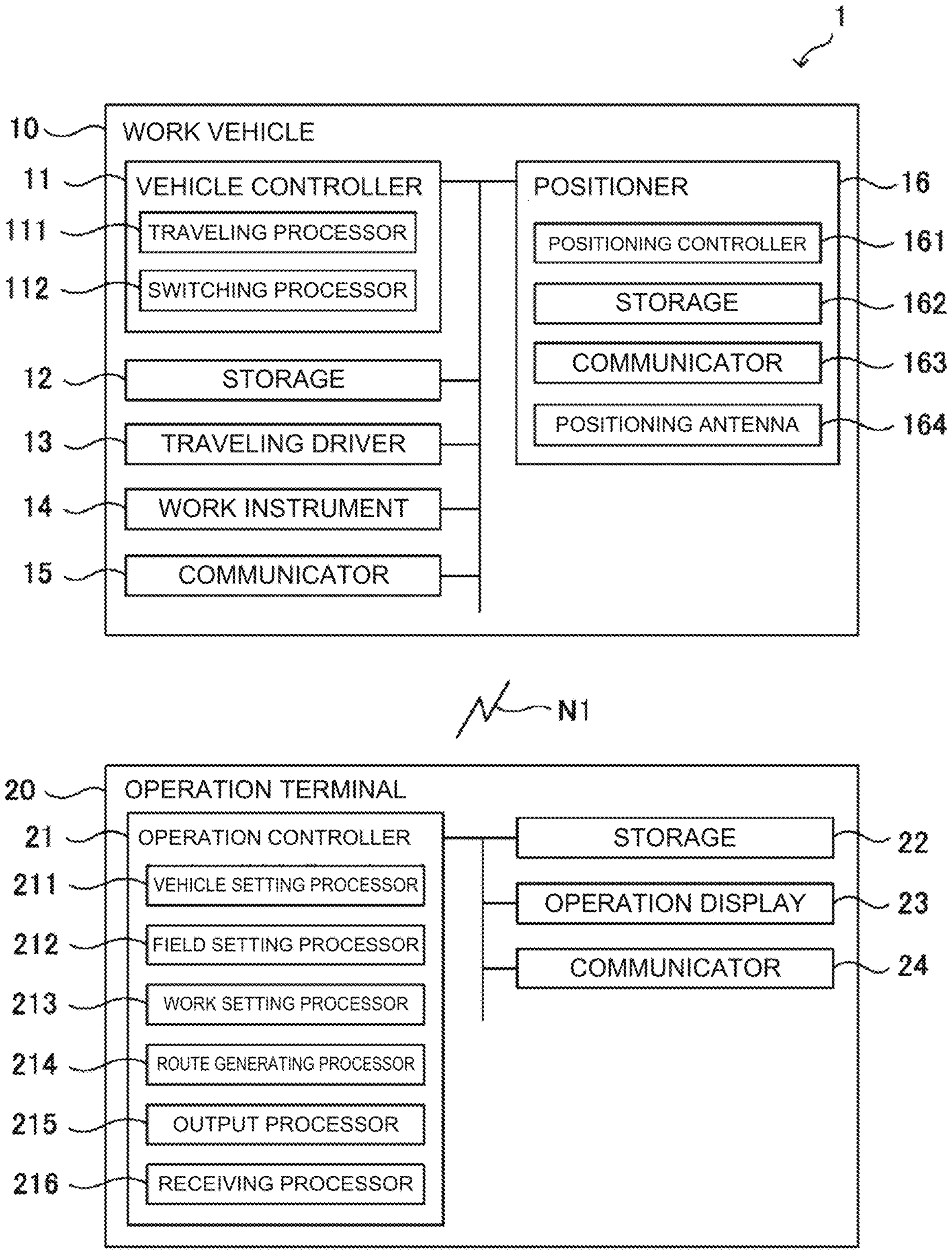
FIG. 1 is a block diagram illustrating a configuration of an automatic traveling system according to an embodiment of the present invention.

As illustrated in FIG. 1, an automatic traveling system 1 according to an embodiment of the present invention includes a work vehicle 10, and an operation terminal 20. The work vehicle 10 and the operation terminal 20 can communicate via a communication network N1. For example, the work vehicle 10 and the operation terminal 20 can communicate with each other via a cellular telephone line network, a packet line network, or a wireless LAN. The automatic traveling system 1 is a system that causes the work vehicle 10 to automatically travel in a field F. The field F is an example of a work area of the present invention.

In the present embodiment, a case in which the work vehicle 10 is a tractor will be described as an example. As another embodiment, the work vehicle 10 may be a rice transplanter, a combine harvester, a construction machine, a snowplow or the like. The work vehicle 10 is a so-called robot tractor equipped with a configuration that can automatically travel (autonomously travel) in the field F (see FIG. 3) according to a predetermined target route R. The work vehicle 10 is also equipped with a work instrument 14 that can be switched between a working posture, which is a posture in which a predetermined work is performed, and a non-working posture, which is a posture in which the predetermined work is not performed. The work vehicle 10, while automatically traveling in the field F, sets the work instrument 14 to the working posture on a work route thereby to cause the work instrument 14 to perform the predetermined work. In the present embodiment, the case in which the work instrument 14 is a cultivator (rough cultivation work instrument) and cultivates work (rough cultivating work) is performed is used as an example. The cultivator is in the non-working posture when the cultivator tines are in the raised position (uppermost position) and in the working posture when the cultivator tines are in the lowered position (lowermost position). The work instrument 14 performs elevating and lowering movements according to the commands of the vehicle controller 11, thereby to switch between the working and non-working postures.

Based on the work vehicle 10's current position information calculated by a positioner 16, the work vehicle 10 automatically travels in accordance with the target route R pre-generated for the field F. The target route R includes a work route (straight route R1) where the work instrument 14 performs the cultivating work and a non-work route (turn route R2) where the work instrument 14 does not perform the cultivating work, thus including a plurality of straight routes R1 and a plurality of turn routes R2 from a work start position S to a work end position G (see FIG. 3).

Figure 3:
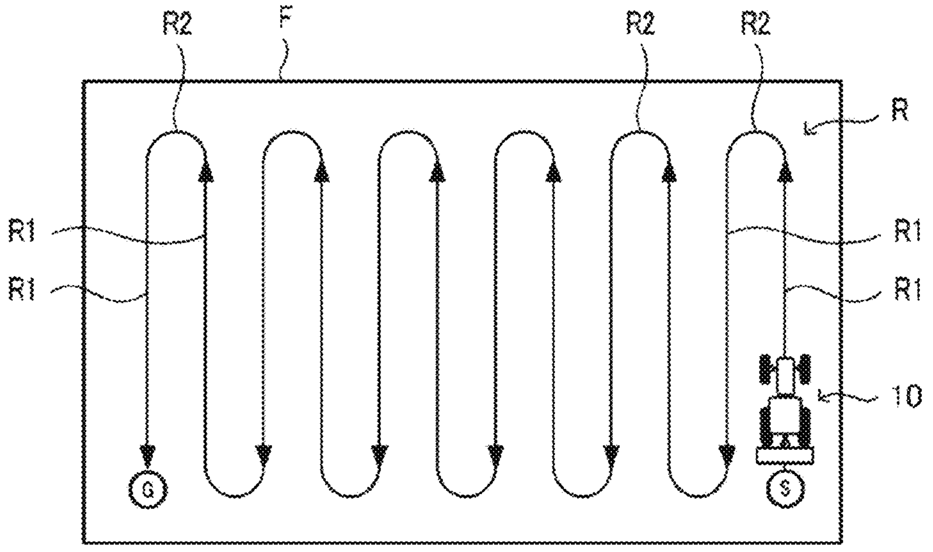
FIG. 3 is a diagram illustrating an example of a target route of the work vehicle according to the embodiment of the present invention.

In the field F shown in FIG. 3, for example, the work vehicle 10 travels along a plurality of straight routes R1 from the work start position S to the work end position G in parallel and reciprocally, while lowering the work instrument 14 on each straight route R1, thereby to perform the cultivating work. The target route R is not limited to the route shown in FIG. 3, but can be set as needed according to the content of the work.

Work Vehicle 10

Figure 2:
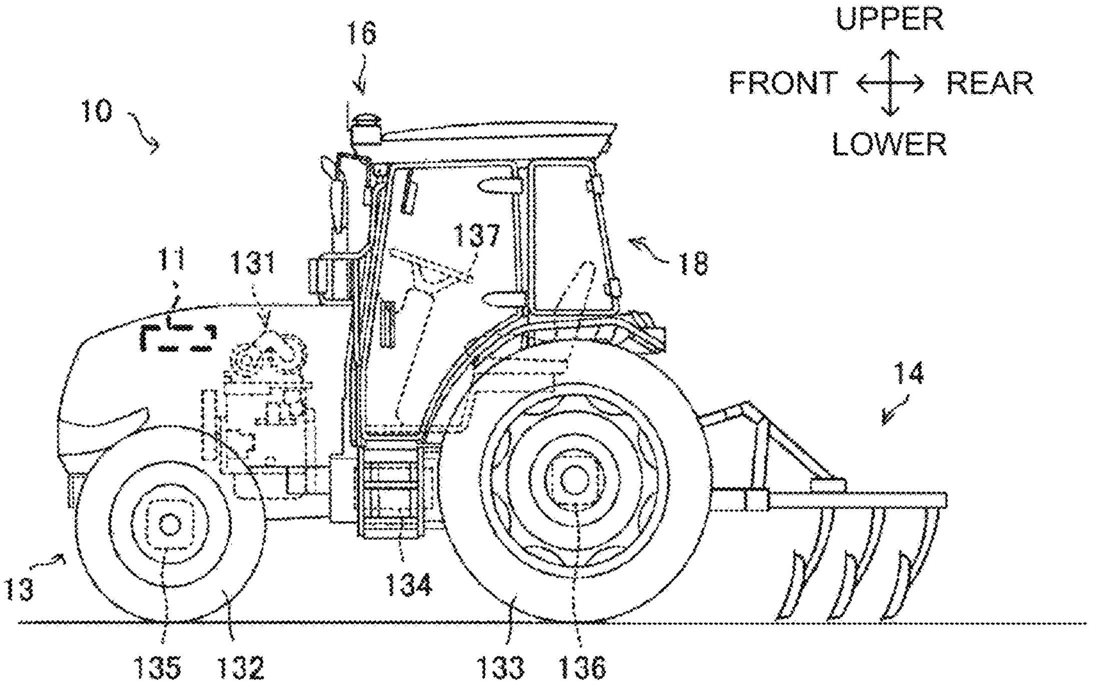
FIG. 2 is an appearance view illustrating an example of the work vehicle according to the embodiment of the present invention.

As shown in FIG. 1 and FIG. 2, the work vehicle 10 has a vehicle controller 11, a storage 12, a traveling driver 13, a work instrument 14, a communicator 15, a positioner 16, and the like. The vehicle controller 11 is electrically connected to the storage 12, the traveling driver 13, the work instrument 14, the positioner 16, and the like. Note that the vehicle controller 11 and the positioner 16 may be capable of executing a wireless communication.

The communicator 15 is a communication interface that connects the work vehicle 10 to the communication network N1 by wire or wirelessly, thereby to execute, via the communication network N1, a data communication, which accords to a predetermined communication protocol, with external devices such as the operation terminal 20.

The storage 12 is a non-volatile storage such as a hard disk drive (HDD) or a solid state drive (SSD) that stores various types of information. The storage 12 stores control programs such as an automatic traveling program for causing the vehicle controller 11 to execute the later-described automatic traveling process (see FIG. 9). For example, the automatic traveling program is recorded in a non-transitory manner in a computer-readable recording medium such as a CD or a DVD, and is read by a predetermined reader (not illustrated) and is stored in the storage 12. The above automatic traveling program may be downloaded from a server (not illustrated) to the work vehicle 10 via the communication network N1 and stored in the storage 12. Further, in the storage 12, the data of the target route R which is generated in the operation terminal 20 is stored.

The traveling driver 13 is a driver that causes the work vehicle 10 to travel. As shown in FIG. 2, the traveling driver 13 includes an engine 131, front wheels 132, rear wheels 133, a transmission 134, a front axle 135, a rear axle 136, a steering wheel 137 and the like. Note that the front wheel 132 and the rear wheel 133 are each provided on the left and right sides of the work vehicle 10. Moreover, the traveling driver 13 is not limited to of the wheel type including the front wheel 132 and the rear wheel 133 but may also be of a crawler type including crawlers provided on the left and right sides of the work vehicle 10.

The engine 131 is a drive source such as a diesel engine or a gasoline engine driven by fuel supplied to a fuel tank, not shown. The traveling driver 13, together with the engine 131 or instead of the engine 131, may include an electric motor as a drive source. Note that, to the engine 131, a generator, not shown, is connected, and the generator supplies power to electric components such as the vehicle controller 11 and batteries provided in the work vehicle 10. Note that the battery is charged by the power supplied from the generator. Then, the electric components such as the vehicle controller 11 and the positioner 16 provided on the work vehicle 10 can be driven by the electric power supplied from the battery even after the engine 131 is stopped.

A driving force of the engine 131 is transmitted to the front wheels 132 through the transmission 134 and the front axle 135 and is transmitted to the rear wheels 133 via the transmission 134 and the rear axle 136. Moreover, the driving force of the engine 131 is transmitted also to the work instrument 14 via a PTO shaft (not shown). When the work vehicle 10 performs the automatic traveling, the traveling driver 13 performs the traveling operation according to the commands of the vehicle controller 11.

The work instrument 14 is, for example, a cultivator, a seeder, a mower, a plow, a fertilizer applicator or the like, which can be removably attached to the work vehicle 10. As a result, the work vehicle 10 can perform various works by using each of the work instruments 14. FIG. 2 shows a case in which the work instrument 14 is a rough cultivator (e.g., a stubble cultivator).

In the work vehicle 10, the work instrument 14 is supported, with a raising/lowering mechanism (not shown), in a manner to be raised and lowered. By controlling the raising/lowering mechanism, the vehicle controller 11 can raise and lower the work instrument 14. For example, the vehicle controller 11, when the work vehicle 10 travels along a work route (straight route R1) in the field F, lowers the work instrument 14, and when the work vehicle 10 travels on a non-work route (turn route R2, headland area) raises the work instrument 14. When obtaining a stop work instruction, the vehicle controller 11 outputs a stop work command to the work instrument 14. For example, when a human operator (user) performs a stop instruction operation at the operation terminal 20, the vehicle controller 11 obtains the stop instruction from the operation terminal 20. When having obtained the stop work instruction, the vehicle controller 11 stops driving the PTO shaft thereby to stop the work of the work instrument 14.

The steering wheel 137 is an operator unit operated by the human operator or the vehicle controller 11. For example, with a hydraulic power steering mechanism (not shown) or the like, the traveling driver 13 changes an angle of the front wheels 132 in response to the steering wheel 137's operation by the vehicle controller 11, thereby to change an advancing direction of the work vehicle 10.

In addition to the steering wheel 137, the traveling driver 13 includes a shift lever, an accelerator, a brake and the like, not shown, operated by the vehicle controller 11. Then, the traveling driver 13 switches a gear of the transmission 134 to a forward gear, a backward gear or the like in accordance with the shift lever's operation by the vehicle controller 11, and switches a travel mode of the work vehicle 10 to forward, backward or the like. Moreover, the vehicle controller 11 operates the accelerator thereby to control the speed of the engine 131. In addition, operating the brake, the vehicle controller 11 brakes revolutions of the front wheels 132 and the rear wheels 133 with an electromagnetic brake.

The positioner 16 is a communicator including a positioning controller 161, a storage 162, a communicator 163, a positioning antenna 164 and the like. For example, the positioner 16 is provided above a cabin 18 on which the human operator boards, as shown in FIG. 2. Moreover, an installation location of the positioner 16 is not limited to the cabin 18. Furthermore, the positioning controller 161, the storage 162, the communicator 163, and the positioning antenna 164 of the positioner 16 may be disposed at different positions in a distributed manner in the work vehicle 10. Note that the battery is connected to the positioner 16 as described above, and the positioner 16 can operate even while the engine 131 is stopped. Moreover, a cell phone terminal, a smart phone, a tablet terminal or the like may be substituted for the positioner 16.

The positioning controller 161 is a computer system including one or a plurality of processors and a storage memory such as a non-volatile memory and a RAM. The storage 162 is a non-volatile memory or the like that stores a program for causing the positioning controller 161 to execute the positioning process as well as data such as positioning information and movement information. For example, the above program is non-transiently recorded in a computer-readable recording medium such as a CD or a DVD, and is read by a predetermined reader (not shown) thereby to be stored in the storage 162. Note that the program may be downloaded from a server (not shown) to the positioner 16 via the communication network N1 and stored in the storage 162.

The communicator 163 is a communication interface for connecting the positioner 16 to the communication network N1 by wire or wirelessly and for executing, via the communication network N1, a data communication, which accords to a predetermined communication protocol, with an external device such as a base station. The positioning antenna 164 is an antenna which receives radio waves (GNSS signals) transmitted from a satellite.

The positioning controller 161 calculates the current position of the work vehicle 10 on the basis of the GNSS signals that the positioning antenna 164 receives from the satellite. For example, in a case where the work vehicle 10 automatically travels in the field F, when the positioning antenna 164 receives radio waves (transmission time, orbital information, and the like) transmitted from each of a plurality of satellites, the positioning controller 161 calculates a distance between the positioning antenna 164 and each satellite, and calculates the current position (latitude and longitude) of the work vehicle 10 on the basis of the calculated distance. Alternatively, the positioning controller 161 may perform positioning by a real-time kinematic method (RTK-GPS positioning method (RTK method)) which calculates the current position of the work vehicle 10 using correction information that corresponds to the base station (reference station) near the work vehicle 10. As described above, the work vehicle 10 performs the automatic travel by using the RTK-method based positioning information. Note that the current position of the work vehicle 10 may be the same as the positioning position (the position of the positioning antenna 164, for example) or it may be a position deviated from the positioning position.

The vehicle controller 11 has control devices such as a CPU, a ROM, and a RAM. The CPU is a processor that executes various types of arithmetic processes. The ROM is a non-volatile storage in which control programs, such as a BIOS and an OS for causing the CPU to execute the various types of arithmetic processing, are stored in advance. The RAM is a volatile or non-volatile storage that stores various types of information and is used as a transient storage memory (work area) for the various types of processes to be executed by the CPU. Further, the vehicle controller 11 causes the CPU to execute the various types of control programs stored in advance in the ROM or the storage 12, thereby to control the work vehicle 10.

By the way, in the conventional technology, when the work instrument 14 has a configuration that switches between the working and non-working postures, there is a problem of poor work (residual plowing) in the work route when switching the postures. An example of this problem is illustrated in FIG. 4.

Figure 4:
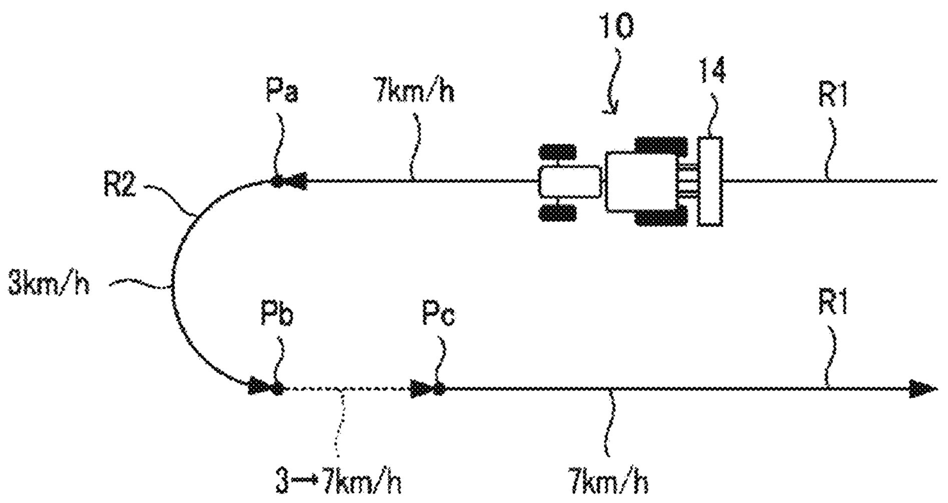
FIG. 4 shows an example of a conventional traveling method of the work vehicle.

FIG. 4 shows the straight route R1 where the work vehicle 10 performs work and the turn route R2 where the work vehicle 10 does not perform work. For example, on the straight route R1, the work vehicle 10 sets the work instrument 14 to the working posture, and performs the cultivating work while traveling straight ahead at a traveling speed of "7 km/h". When reaching an end position Pa of the straight route R1, the work vehicle 10 starts raising the work instrument 14, and reduces the traveling speed to "3 km/h". On the turn route R2, the work vehicle 10 travels at a traveling speed of 3 km/h with the work instrument 14 set to the non-working posture.

Next, when reaching an end position Pb of the turn route R2, the work vehicle 10 starts lowering the work instrument 14, and accelerates the traveling speed from "3 km/h" to "7 km/h". When reaching a predetermined position Pc of the straight route R1, the work vehicle 10 performs the cultivating work while traveling straight ahead at a traveling speed of "7 km/h".

Here, the work instrument 14 takes a predetermined amount of time from the time the cultivating tines start lowering until reaching a predetermined depth in the ground. Therefore, in the straight route R1's section from the end position Pb, where the work vehicle 10 travels under acceleration, to the predetermined position Pc, if the cultivating work is performed with the cultivating tines not reaching the predetermined depth, it results in poor cultivation (residual cultivation).

In contrast, as shown below, the automatic traveling system 1 according to the present embodiment can suppress work defects in the work vehicle 10 equipped with the work instrument 14 that can switch between the working and non-working postures.

Specifically, as shown in FIG. 1, the vehicle controller 11 includes various processors, such as a traveling processor 111 and a switching processor 112. Note that the vehicle controller 11 functions as the various processors, with the CPU executing various types of processes that accord to the automatic traveling program. Further, a part or all of the processors may be configured by electronic circuits. Note that the automatic traveling program may be a program that causes a plurality of processors to function as the processors.

The traveling processor 111 controls travelling of the work vehicle 10. Specifically, the traveling processor 111 causes the work vehicle 10 to perform the automatic traveling on the basis of position information indicating the work vehicle 10's current position which is measured and positioned by the positioning controller 161. For example, if the above positioning state can be measured and positioned by the RTK and the human operator presses the start button on an operation screen (not shown) of the operation terminal 20, the operation terminal 20 outputs a work starting instruction to the work vehicle 10. Obtaining the above work starting instruction from the operation terminal 20, the traveling processor 111 of the work vehicle 10 starts the automatic traveling of the work vehicle 10 on the basis of the position information indicating the work vehicle 10's current position which is measured and positioned by the positioning controller 161. As a result, the work vehicle 10 starts the automatic traveling according to the target route R, starting the work by the work instrument 14. The target route R is generated, for example, by the operation terminal 20. Obtaining the data of the target route R from the operation terminal 20, the work vehicle 10 automatically travels in the field F according to the target route R (See FIG. 3).

The target route R also includes information on the traveling speed of the work vehicle 10. The traveling processor 111 switches the traveling speed of the work vehicle 10 based on the position information of the work vehicle 10. For example, when, in the operation terminal 20, the traveling speed on the straight route R1 is set to "7 km/h and the traveling speed on the turn route R2 is set to "3 km/h" (see FIG. 7), the traveling processor 111 sets the traveling speed to "7 km/h" when the work vehicle 10 enters the straight route R1, and to "3 km/h" when the work vehicle 10 enters the turn route R2. The traveling driver 13 performs the traveling operation according to the traveling speed set by the traveling processor 111. The details of the above method of setting the traveling speed in the present embodiment are described below.

Further, obtaining a traveling stop instruction from the operation terminal 20, the traveling processor 111 stops the automatic traveling of the work vehicle 10. For example, the human operator, when pressing the stop button on an operation screen of the operation terminal 20, causes the operation terminal 20 to output the above traveling stop instruction to the work vehicle 10. Obtaining the above traveling stop instruction from the operation terminal 20, the traveling processor 111 stops the automatic traveling of the work vehicle 10. Accordingly, the work vehicle 10 stops the automatic traveling and stops the work performed by the work instrument 14. The traveling processor 111 is an example of a first traveling processor, a second traveling processor and a third traveling processor of the present invention.

The switching processor 112 sets the posture of the work instrument 14. Specifically, the switching processor 112 switches the work instrument 14 to a working posture, which is a posture in which the predetermined work (herein, cultivating work) is performed, and a non-working posture, which is a posture in which the predetermined work (cultivating work) is not performed. The switching processor 112 switches the posture of the work instrument 14 based on the position information of the work vehicle 10. The switching processor 112 outputs switching commands (e.g., raise and lower instructions) to the above raising/lowering mechanism of the work instrument 14.

For example, with the work vehicle 10 reaching the starting position of the straight route R1, the switching processor 112 outputs a lowering instruction to the raising/lowering mechanism, thereby to lower the work instrument 14 to the working posture (lowermost position). Also, for example, with the work vehicle 10 reaching an end position of the straight route R1 (the starting position of the turn route R2), the switching processor 112 outputs a raising instruction to the raising/lowering mechanism, thereby to raise the work instrument 14 to the non-working posture (top position). Also, for example, with the work vehicle 10 reaching the end position of the turn route R2 (the starting position of the straight route R1), the switching processor 112 outputs a lowering instruction to the raising/lowering mechanism, thereby to lower the work instrument 14 to the working posture (lowermost position).

Thus, based on the position information of the work vehicle 10, the vehicle controller 11 changes the posture (working posture, non-working posture) of the work instrument 14, and also changes the traveling speed of the work vehicle 10.

Operation Terminal 20

As illustrated in FIG. 1, the operation terminal 20 is an information processor that includes an operation controller 21, a storage 22, an operation display 23, a communicator 24, etc. It is also possible the operation terminal 20 is configured with a portable terminal such as a tablet terminal or a smartphone.

The communicator 24 is a communication interface that connects the operation terminal 20 to the communication network N1 by wire or wirelessly, thereby to execute, via the communication network N1, a data communication, which accords to a predetermined communication protocol, with one or more external devices such as the work vehicle 10.

The operation display 23 is a user interface that includes a display, such as a liquid crystal display or an organic EL display that displays various types of information, and an operator unit, such as a touch screen, mouse, or keyboard that receives operations. On an operation screen displayed on the above display, the human operator can operate the above operator unit thereby to register various types of information (work vehicle information, field information, work information, or the like to be described below). Further, the human operator can operate the above operator unit, making it possible to provide an automatic traveling instruction directed to the work vehicle 10. Furthermore, at a location distant from the work vehicle 10, and by a traveling trajectory displayed on the operation terminal 20, the human operator can grasp the traveling state of the work vehicle 10 that automatically travels in the field F along the target route R.

The storage 22 is a non-volatile storage, such as an HDD or an SSD, storing various types of information. The storage 22 stores a control program for causing the operation controller 21 to perform a predetermined controlling process. For example, the control program is non-transiently recorded in a computer-readable recording medium such as a CD or a DVD, and is read by a predetermined reader (not shown) included in the operation terminal 20, and is stored in the storage 22. Note that the above automatic traveling program may be downloaded from a server (not illustrated) to the operation terminal 20 via the communication network N1 and stored in the storage 22. The storage 22 may also store the work information transmitted from the work vehicle 10.

In addition, a dedicated application for causing the work vehicle 10 to automatically travel is installed in the storage 22. The operation controller 21 activates the above dedicated application thereby to execute the setting process of various information about the work vehicle 10, the generating process of the target route R for the work vehicle 10, and the automatic traveling instruction to the work vehicle 10.

The operation controller 21 has control devices such as a CPU, a ROM, and a RAM. The CPU is a processor that executes various types of arithmetic processes. The ROM is a non-volatile storage in which control programs, such as a BIOS and an OS for causing the CPU to execute the various types of arithmetic processing, are stored in advance. The RAM is a volatile or non-volatile storage that stores various types of information and is used as a transient storage memory (work area) for the various types of processes to be executed by the CPU. Further, the operation controller 21 causes the above CPU to execute the various types of control programs stored in advance in the above ROM or the storage 22, thereby to control the operation terminal 20.

As shown in FIG. 1, the operation controller 21 includes various processors such as a vehicle setting processor 211, a field setting processor 212, a work setting processor 213, a route generating processor 214, an output processor 215, and a receiving processor 216. Furthermore, with the CPU, the operation controller 21 executes various processes that accord to the control program, thereby to function as the various processors. Further, a part or all of the processors may be configured by electronic circuits. Note that the above control programs may be programs that cause a plurality of processors to function as the above processors.

The vehicle setting processor 211 sets information about the work vehicle 10 (hereinafter referred to as "work vehicle information"). With the human operator executing, at the operation terminal 20, an operation of registering information such as the model of the work vehicle 10, the location of the positioning antenna 164 mounted on the work vehicle 10, the type of the work instrument 14, the size and shape of the work instrument 14, and the work instrument 14's position relative to the work vehicle 10, the vehicle setting processor 211 sets the above information.

Figure 5:
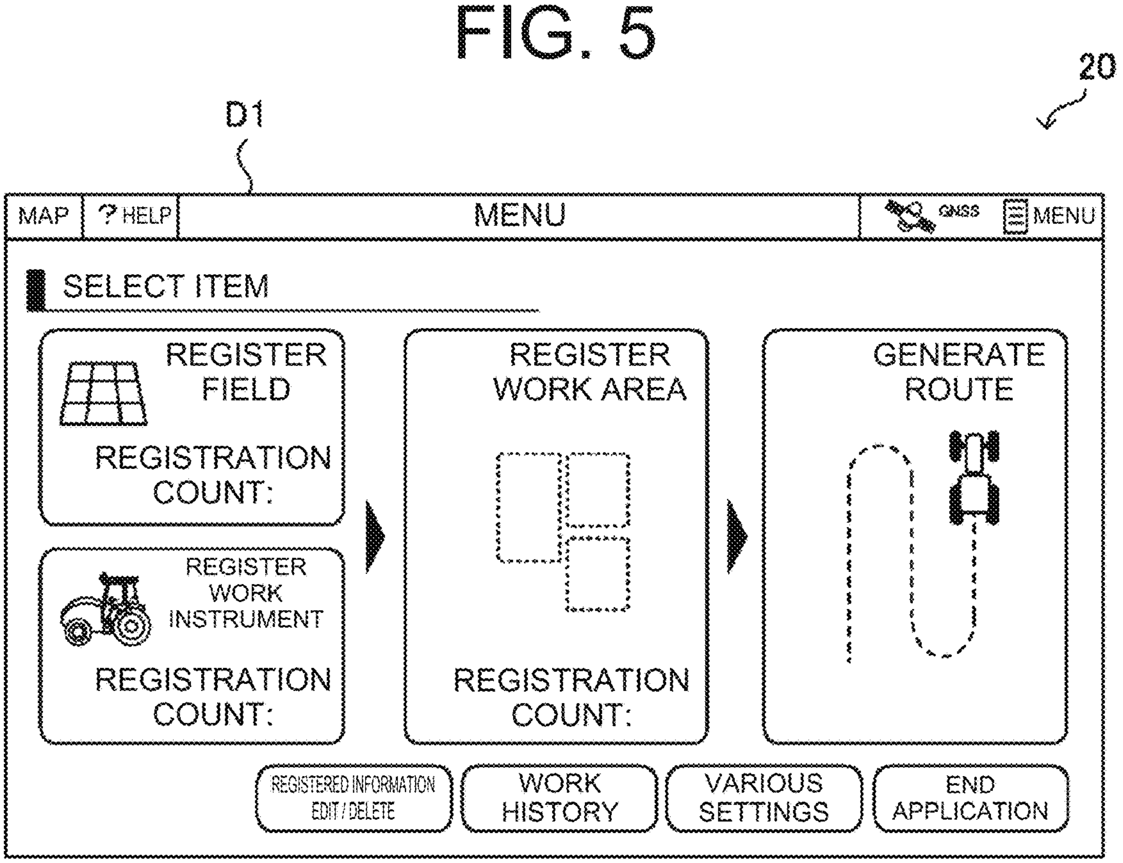
FIG. 5 is a diagram illustrating an example of an operation screen displayed on an operation terminal according to the embodiment of the present invention.
Figure 6:
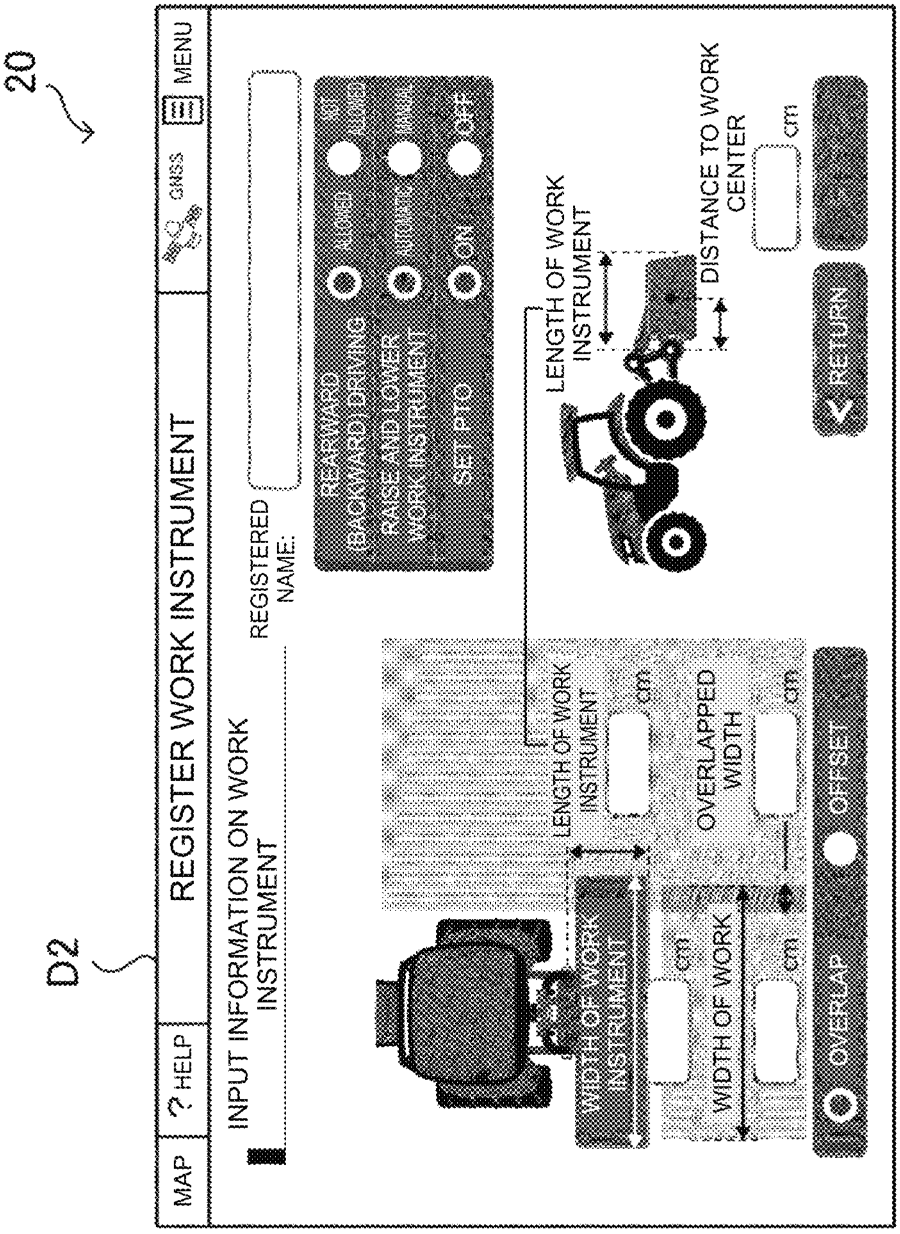
FIG. 6 is a diagram illustrating an example of the operation screen displayed on the operation terminal according to the embodiment of the present invention.

For example, the human operator selects "Work Instrument Registration" on a menu screen D1 shown in FIG. 5, thereby to register the above work vehicle information. FIG. 6 shows an example of an operation screen D2 for registering the information on the work instrument 14. On the operation screen D2, the human operator registers the size of the work instrument 14 and other information.

The field setting processor 212 sets the information about the field F (hereinafter referred to as "field information"). The field setting processor 212 executes, at the operation terminal 20, an operation to register the information such as the position and shape of the field F, the work start position S at which the work is started and the work end position G at which the work is ended, and a work direction, thereby to set the above information.

Note that the work direction means a direction in which the work vehicle 10 is caused to travel while performing the work with the work instrument 14 in the area, which is the field F's area excluding a headland, a non-cultivated land and the like.

The information of the position and shape of the field F can be obtained automatically, for example, by the human operator boarding the work vehicle 10 and making one round of the field F along the outer periphery of the field F thereby to record the transition of the then position information of the positioning antenna 164. Further, the position and shape of the field F can also be obtained on the basis of a polygon obtained by the human operator operating the operation terminal 20 in a state where a map is displayed on the operation terminal 20 thereby to designate a plurality of points on the map. The area specified by the obtained position and shape of the field F is the area where the work vehicle 10 can be caused to travel (travel area).

The work setting processor 213 sets information on how the work is specifically performed (hereinafter referred to as "work information"). The work setting processor 213 is configured to enable setting, as the work information, whether or not the work vehicle 10 (unmanned tractor) and the manned work vehicle 10 do a cooperative work, the number of skips, which is the number of work routes to be skipped when the work vehicle 10 turns in the headland, the width of the headland, and the width of the non-cultivated land, etc.

Based on setting information, the route generating processor 214 generates the target route R, which is a route where the work vehicle 10 is caused to automatically travel. The target route R in the present embodiment includes a work route (straight route R1) where the work instrument 14 performs the cultivating work and a non-work route (turn route R2) where the work instrument 14 does not perform the cultivating work (see FIG. 3). The route generating processor 214 generates the target route R of the work vehicle 10 based on each setting information set at the vehicle setting processor 211, the field setting processor 212, and the work setting processor 213.

Specifically, the route generating processor 214 generates the target route R (FIG. 3) based on the work start position S and the work end position G registered in the field setting. The target route R is not limited to the route shown in FIG. 3.

Figure 7:
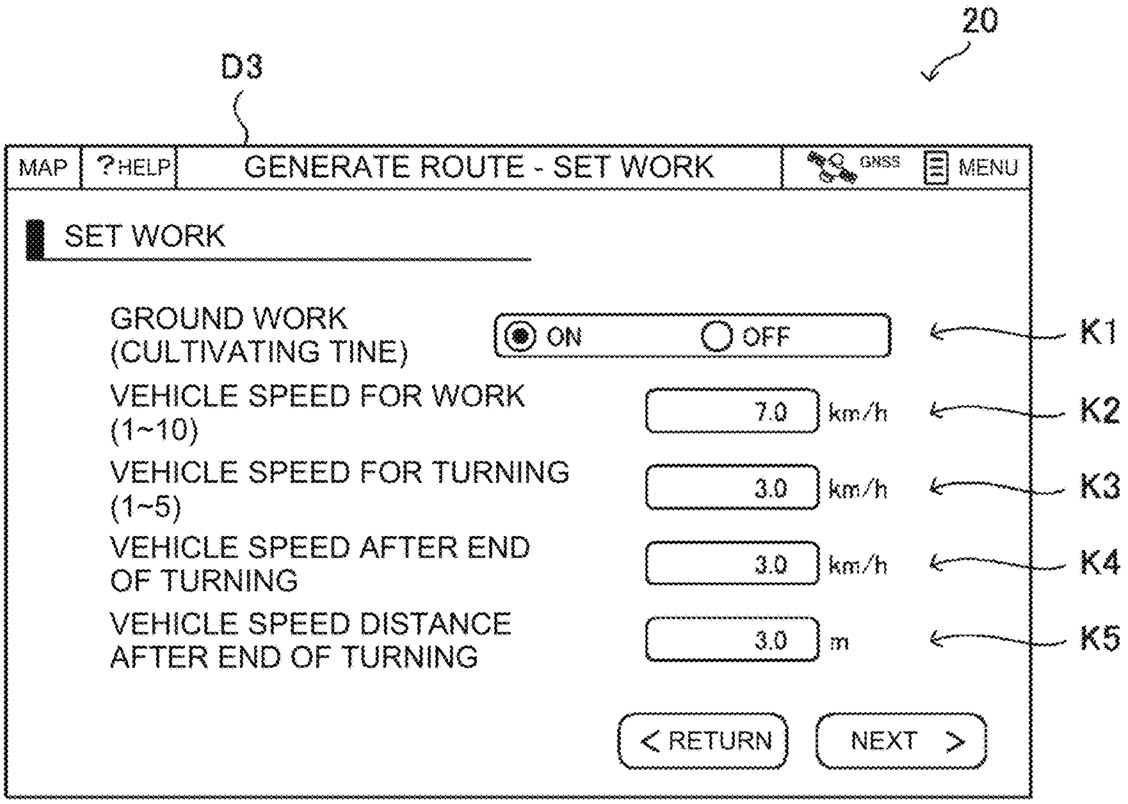
FIG. 7 is a diagram illustrating an example of the operation screen displayed on the operation terminal according to the embodiment of the present invention.

Further, the route generating processor 214 sets the traveling speed of the work vehicle 10 as associated with the target route R. For example, the human operator selects "Route Generation" on the menu screen D1 shown in FIG. 5, thereby to register the above traveling speed. FIG. 7 shows an example of an operation screen D3 for registering the information on the traveling speed of the work vehicle 10. The operation screen D3 includes a set column K1 for setting ON/OFF of ground work (cultivating work), a set column K2 for setting the vehicle speed during work (traveling speed of straight route R1), a set column K3 for setting the vehicle speed during turning (traveling speed of turn route R2), a set column K4 for setting the vehicle speed at the end of turning (traveling speed of a partial route R1*a* of straight route R1), a set column K5 for setting the vehicle speed distance at the end of the turn (distance of partial route R1*a*), and so on. On the operation screen D3, the human operator registers each of the set columns K1 to K5. Thus, from the human operator, the route generating processor 214 receives operations to set each of the set columns K1 to K5.

the route generating processor 214 registers the information set in the set columns K1 to K5, as associated with the target route R. The route generating processor 214 registers a traveling speed of "7 km/h" as associated with the straight route R1, registers a traveling speed of "3 km/h" as associated with the turn route R2, registers a traveling speed of "3 km/h" as associated with the partial route R1*a* of the straight route R1 (see FIG. 8), and a travel distance of "3.0 m" as associated with the partial route R1*a* of the straight route R1.

To the work vehicle 10, the output processor 215 outputs the target route R's data generated by the route generating processor 214. Based on the human operator's operation, the output processor 215 outputs work start and work end instructions to the work vehicle 10.

From the human operator, the receiving processor 216 receives an operation to start the work (work start instruction operation), an operation to stop the work of the automatically traveling work vehicle 10 (work stop instruction operation), etc. With the receiving processor 216 receiving the work start instruction operation, the output processor 215 outputs the work start instruction to the work vehicle 10. With this, the vehicle controller 11 of the work vehicle 10 obtains the work start instruction from the operation terminal 20. Obtaining the work start instruction, the vehicle controller 11 starts the work and traveling of the work vehicle 10. With the receiving processor 216 receiving the work stop instruction operation, the output processor 215 outputs the work stop instruction to the work vehicle 10. With this, the vehicle controller 11 of the work vehicle 10 obtains the work stop instruction from the operation terminal 20. Obtaining the traveling stop instruction, the vehicle controller 11 stops the work and traveling of the work vehicle 10.

Receiving the target route R's data transferred from the operation terminal 20, the work vehicle 10 stores the data in the storage 12. Here, the work vehicle 10 is so configured as to be able to perform the automatic traveling in a case where the current position is in the field F and as to be unable to perform the automatic traveling in a case where the current position is outside the field F. Further, the work vehicle 10 is so configured as to be able to perform the automatic traveling in a case where the current position matches the work start position S, for example.

In a case where the current position matches the work start position S; when the start button is pressed by the human operator on the operation screen thereby to give the work starting instruction, the work vehicle 10, with the vehicle controller 11, starts the cultivating work by the work instrument 14. That is, the operation controller 21 allows the automatic traveling of the work vehicle 10 on the condition that the current position matches the work start position S. Note that the condition for allowing the automatic traveling of the work vehicle 10 is not limited to the above.

The vehicle controller 11, based on the information on the target route R, controls the work vehicle 10 from the work start position S to the work end position G and meanwhile causes the work vehicle 10 to automatically travel, and also raises and lowers the work instrument 14 thereby to cause the work vehicle 10 to perform the cultivating work. Further, it is also possible that, with the work vehicle 10 ending the work, the vehicle controller 11 causes the work vehicle 10 to perform the automatic traveling from the work end position G to the entrance of the field F. In a case where the work vehicle 10 is performing the automatic traveling, the operation controller 21, can display, on the operation display 23, the state (position, traveling speed, work situation, etc.) of the work vehicle 10, which state is received from the work vehicle 10.

Note that, via the communication network N1, the operation terminal 20 may be able to access a website (agricultural support site) of an agricultural support service provided by a server (not shown). In this case, with the operation controller 21 executing a browser program, the operation terminal 20 can function as a terminal for operating the server. Then, the server is equipped with each of the above processors and executes each process.

Figure 8:
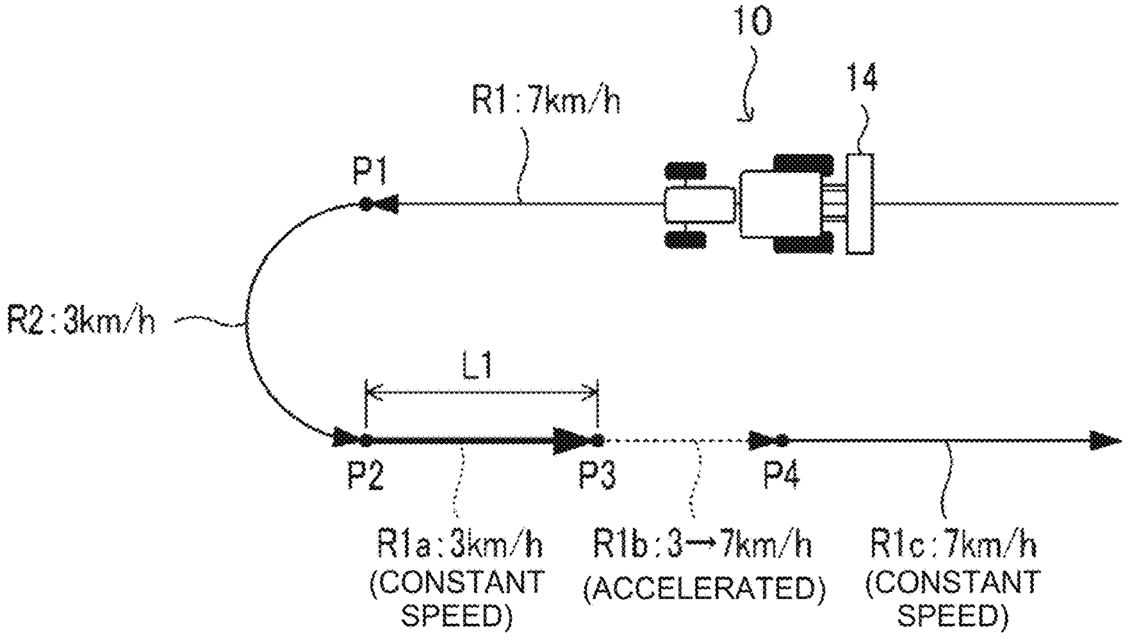
FIG. 8 is a diagram illustrating an example of a traveling method of the work vehicle according to the embodiment of the present invention.

Here, an example of a traveling method in which the work vehicle 10 automatically travels based on the target route R generated in the present embodiment is to be described using FIG. 8. The target route R includes the information that is set on the operation screen D3 in FIG. 7.

FIG. 8 shows the straight route R1 where the work vehicle 10 performs the work and the turn route R2 where the work vehicle 10 does not perform the work. For example, on the straight route R1, the work vehicle 10 sets the work instrument 14 to the working posture, and performs the cultivating work while traveling straight ahead at a traveling speed of "7 km/h". When reaching an end position P1 of the straight route R1, the work vehicle 10 starts raising the work instrument 14, and reduces the traveling speed to "3 km/h". On the turn route R2, the work vehicle 10 travels at a traveling speed of 3 km/h with the work instrument 14 set to the non-working posture.

Next, when reaching an end position P2 of the turn route R2, the work vehicle 10 start lowering the work instrument 14, and sets the traveling speed to "3 km/h". Here, the traveling speed is maintained at "3 km/h" because being the same as the traveling speed on the turn route R2.

The work vehicle 10 travels at a constant traveling speed of "3 km/h" to a predetermined position P3 which is away from the end position P2 by a set distance L1. In the section from the end position P2 to the predetermined position P3, the work vehicle 10 lowers the work instrument 14 to the lowermost position, thereby to cause the cultivating tines to reach a predetermined depth in the ground. The set distance L1 is a preset distance, for example, "3.0 m" (set column K5 in FIG. 7), which is registered by the human operator.

Next, when reaching the predetermined position P3, the work vehicle 10 accelerates the traveling speed from "3 km/h" to "7 km/h" while performing the cultivating work. When reaching a predetermined position P4 on the straight route R1, the work vehicle 10 travels at a constant traveling speed of "7 km/h". The predetermined position P3 is a position that is away from the connection position of the turn route R2 and the straight route R1 (end position P2) by the set distance L1 that is set preliminarily.

Thus, the vehicle controller 11 of the work vehicle 10, in the straight route R1 (first work route), sets the work instrument 14 to the working posture and causes the work vehicle 10 to travel at "7 km/h" (first traveling speed), and, in the turn route R2 (non-work route) connecting to the straight route R1, sets the work instrument 14 to the non-working posture and causes the work vehicle 10 to travel at a speed of 3 km/h (second traveling speed). In addition, of the straight route R1 that connects to the turn route R2, in the partial route R1*a* (first partial route) from the connection position (end position P2) of the turn route R2 and the straight route R1 to the predetermined position P3, the vehicle controller 11 causes the work instrument 14 to change from the non-working posture to the working posture and causes the work vehicle 10 to travel at a third traveling speed (e.g., "3 km/h"), which is lower than the first traveling speed).

As shown in FIG. 8, the vehicle controller 11, in the partial route R1*a*, causes the work vehicle 10 to travel at a constant traveling speed of "3 km/h" (the third traveling speed), in the partial route R1*b* (second partial route) following the partial route R1*a*, causes the work vehicle 10 to travel under acceleration from 3 km/h (third traveling speed) to 7 km/h (first traveling speed), and in the partial route R1*c* (third partial route) following the partial route R1*b*,causes the work vehicle 10 to travel at a constant traveling speed of 7 km/h (first traveling speed).

In the present embodiment, until the work instrument 14 shifts from the non-working posture (top position) to the working posture (lowermost position), the vehicle controller 11 sets the traveling speed on the work route (straight route R1) to a speed (e.g., 3 km/h) lower than the traveling speed during the work (e.g., 7 km/h), and maintains the set lower traveling speed. This allows the distance of the portion of the work route traveled by the work vehicle 10 during the period when the work instrument 14 shifts from the non-working posture to the working posture to be shorter than in the conventional configuration (see FIG. 4), making it possible to suppress poor cultivation (residual cultivation).

Automatic Traveling Process

Figure 9:
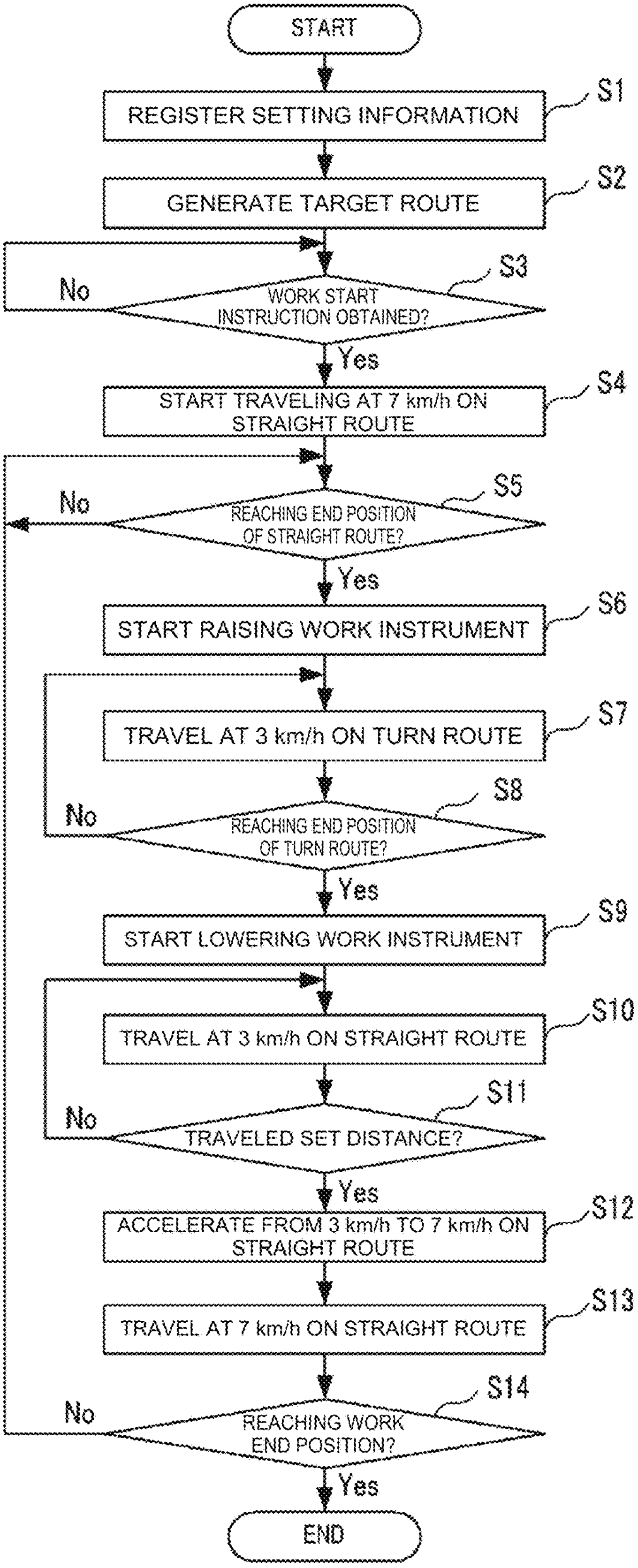
FIG. 9 is a flowchart illustrating an example of a procedure of an automatic traveling process executed by the automatic traveling system according to the embodiment of the present invention.

The following is an example of the above automatic traveling process performed by the automatic traveling system 1, with reference to FIG. 9. For example, the automatic traveling process is started by the vehicle controller 11 and the operation controller 21 when the human operator starts the operation to set the target route R of the work vehicle 10.

Furthermore, the present invention may be regarded as an invention of an automatic traveling method for executing one or more steps included in the automatic traveling process. Further, it is also possible to appropriately omit one or more steps included in the automatic traveling process described herein. Note that each step in the above automatic traveling process may be executed in a different order as long as the same functional effect is obtained. Furthermore, although a case where the vehicle controller 11 and the operation controller 21 execute each step in the above automatic traveling process is to be described here as an example, an automatic traveling method in which one or more processors execute each step in the automatic traveling process in a distributed manner is also considered as another embodiment.

In step S1, the operation controller 21 of the operation terminal 20 registers various types of setting information. Specifically, the operation controller 21 sets and registers the information (work vehicle information) on the work vehicle 10, information (field information) on the field F, and information (work information) on the work, based on the human operator's setting operation. The operation controller 21 also sets and registers information such as the work start position S, the work end position G, and the traveling direction.

Then, in step S2, the operation controller 21 generates the target route R based on the various types of setting information. For example, in the field F, the operation controller 21 generates, based on the work start position S and the work end position G specified by the human operator, the target route R (see FIG. 3) connecting the work start position S and the work end position G. Also, on the operation screen D3 shown in FIG. 7, the human operator registers information such as the traveling speed of the work vehicle 10. The operation controller 21 registers the information set in the set columns K1 to K5 on the operation screen D3 as associated with the target route R. The operation controller 21 also stores the data of the target route R in the storage 22.

Next, in step S3, the vehicle controller 11 of the work vehicle 10 determines whether or not the work starting instruction has been obtained from the operation terminal 20. For example, the human operator, when pressing the start button on the operation screen of the operation terminal 20, causes the operation terminal 20 to output, to the work vehicle 10, the data of the target route R and the work starting instruction. When the vehicle controller 11 obtains the data and the work starting instruction from the operation terminal 20 (S3: Yes), the process proceeds to step S4. The vehicle controller 11 stands by until obtaining the work starting instruction from the operation terminal 20 (S3: No).

In step S4, the vehicle controller 11 starts the automatic traveling process along the target route R that accords to the above data. Here, the vehicle controller 11 sets the traveling speed to "7 km/h" and starts the straight traveling when the current position of the work vehicle 10 matches the work start position S (the starting position of the straight route R1). The vehicle controller 11 also lowers the work instrument 14 and sets the work instrument 14 in the working posture (lowermost position) thereby to start the cultivating work. As a result, the work vehicle 10 starts the automatic traveling and the cultivating work according to the target route R.

Next, in step S5, the vehicle controller 11 determines whether the work vehicle 10 has reached the end position P1 of the straight route R1 (see FIG. 8). When the work vehicle 10 reaches the end position P1 (S5: Yes), the process moves to step S6. Until reaching the end position P1, the work vehicle 10 performs the cultivating work while traveling straight ahead at a traveling speed of "7 km/h" (S5: No).

In step S6, the vehicle controller 11 starts raising the work instrument 14. Specifically, the vehicle controller 11, with the work vehicle 10 reaching the end position P1, outputs a raising instruction to the above raising/lowering mechanism of the work instrument 14. The raising/lowering mechanism raises the work instrument 14 (cultivating tines) from the lowermost position to the highest position according to the raising instruction.

Next, in step S7, the vehicle controller 11 reduces the traveling speed of the work vehicle 10 to "3 km/h". Specifically, the vehicle controller 11 outputs a traveling speed change instruction to the traveling driver 13 when the work vehicle 10 reaches the end position P1. According to the above change instruction, the traveling driver 13 reduces the traveling speed from "7 km/h" to "3 km/h". As a result, on the turn route R2, the work vehicle 10 travels at a traveling speed of "3 km/h" with the work instrument 14 being raised.

Next, in step S8, the vehicle controller 11 determines whether or not the work vehicle 10 has reached the end position P2 of the turn route R2 (see FIG. 8). When the work vehicle 10 reaches the end position P2 (S8: Yes), the process moves to step S9. Until reaching the end position P2, the work vehicle 10 travels in a turning manner at a traveling speed of "3 km/h" (S8: No).

In step S9, the vehicle controller 11 starts lowering the work instrument 14. Specifically, the vehicle controller 11, with the work vehicle 10 reaching the end position P2, outputs a lowering instruction to the raising/lowering mechanism of the work instrument 14. The raising/lowering mechanism lowers the work instrument 14 (cultivating tines) from the uppermost position to the lowermost position according to the lowering instruction.

Next, in step S10, the vehicle controller 11 sets (maintains) the traveling speed of the work vehicle 10 at "3 km/h" (maintained). Specifically, when the work vehicle 10 reaches the end position P2, the vehicle controller 11 outputs, to the traveling driver 13, an instruction to maintain the traveling speed. The traveling driver 13 maintains the traveling speed of "3 km/h" in accordance with the above instruction.

As a result, in the partial route R1*a*, the work vehicle 10 travels at the traveling speed of "3 km/h" (see FIG. 8) while lowering the work instrument 14.

When the traveling speed on the partial route R1*a* is the same as the traveling speed on the turn route R2, the vehicle controller 11 does not need to output, to the traveling driver 13, the instruction to maintain the traveling speed.

Next, in step S11, the vehicle controller 11 determines whether or not the work vehicle 10 has traveled the set distance L1. The vehicle controller 11 determines whether or not the work vehicle 10, on the straight route R1, has traveled to the predetermined position P3 away from the end position P2 by the set distance L1 (see FIG. 8) at a traveling speed of "3 km/h" (whether or not reaching the predetermined position P3). When the work vehicle 10 has traveled the set distance L1 (S11: Yes), the process moves to step S12. Until reaching the set distance L1 (predetermined position P3), the work vehicle 10 travels at a constant traveling speed of "3 km/h" (S11: No). The work vehicle 10 lowers the work instrument 14 in the section from the end position P2 to the predetermined position P3 (set distance L1) thereby to cause the cultivating tines to reach a predetermined depth in the ground.

In step S12, the vehicle controller 11 accelerates the traveling speed of the work vehicle 10 from "3 km/h" to "7 km/h". Specifically, when the work vehicle 10 has traveled the set distance L1 (predetermined position P3) at "3 km/h", the vehicle controller 11 outputs the traveling speed change instruction to the traveling driver 13. The traveling driver 13 accelerates the traveling speed from "3 km/h" to "7 km/h". In the section from the predetermined position P3 to the predetermined position P4 with the traveling speed reaching "7 km/h" (see FIG. 8), the work vehicle 10 travels under acceleration while maintaining the work instrument 14 in the lowermost position and performing the cultivating work.

Next, in step S13, the vehicle controller 11 causes the work vehicle 10 to travel at a constant traveling speed of "7 km/h". Specifically, the vehicle controller 11 maintains the traveling speed of the work vehicle 10 at "7 km/h and causes the work vehicle 10 to travel at the constant traveling speed from the predetermined position P4 until the work vehicle 10 reaches the end position of the straight route R1. As a result, the work vehicle 10 travels straight ahead on the straight route R1 while performing the cultivating work.

Next, in step S14, the vehicle controller 11 determines whether or not the work vehicle 10 has reached the work end position G (see FIG. 3). When the work vehicle 10 has reached the work end position G (S14: Yes), the process ends. On the other hand, when the work vehicle 10 has not reached the work end position G (S14: No), the process returns to step S5, and the processes described above are repeated.

Thus, until the work vehicle 10 reaches the work end position G from the start of the automatic traveling at the work start position S, the vehicle controller 11, according to the target route R (straight route R1 and turn route R2), causes the work vehicle 10 to automatically travel while repeating the process of changing the traveling speed of the work vehicle 10 and the process of switching the posture of the work instrument 14. In this way, the automatic traveling system 1 executes the above automatic traveling process.

As described above, the automatic traveling system 1 according to the present embodiment is a system to cause the work vehicle 10 to automatically travel in the field F (work area) according to the target route R, where the work vehicle 10 is equipped with the work instrument 14 that can be switched between the working posture, which is a posture in which the predetermined work (cultivating work) is performed, and the non-working posture, which is a posture in which the predetermined work is not performed.

In addition, the automatic traveling system 1, in the first work route (straight route R1) included in the target route R, sets the work instrument 14 to the working posture and causes the work vehicle 10 to travel at the first traveling speed. In addition, the automatic traveling system 1, in the non-work route (turn route R2) connecting to the first work route included in the target route R, sets the work instrument 14 to the non-working posture and causes the work vehicle 10 to travel at the second traveling speed that is lower than the first traveling speed. Also, of the second work route (straight route R1) that connects to the non-work route included in the target route R, in the partial route (partial route R1*a*) from the connection position (end position P2) of the non-work route and the second work route to the predetermined position P3, the automatic traveling system 1 causes the work instrument 14 to change from the non-working posture to the working posture, and causes the work vehicle 10 to travel at the third traveling speed which is lower than the first traveling speed.

Thus, when the work vehicle 10 moves from the non-work route to the work route, the automatic traveling system 1, with the traveling speed of the work vehicle 10 maintained at the low speed, changes the posture of the work instrument 14 from the non-working posture to the working posture. This allows the work instrument 14 to shift to the working posture while the work vehicle 10 is traveling at the low speed. For example, when the work vehicle 10 enters the straight route R1 from the turn route R2; with the work vehicle 10 maintaining the traveling speed at the speed for traveling in a turning manner, the work instrument 14 is lowered. This allows the cultivating tines of the work instrument 14 to reach the predetermined depth in the ground while the work vehicle 10 is traveling at a low speed. After the cultivating tines of the work instrument 14 reach the predetermined depth in the ground, the work vehicle 10 can be accelerated to the speed for working, and the cultivating work can be performed at the speed for working.

This allows the distance of the portion of the work route traveled by the work vehicle 10 during the period when the work instrument 14 shifts from the non-working posture to the working posture to be shorter than in the conventional configuration (see FIG. 4), making it possible to suppress poor cultivation (residual cultivation). In the present embodiment, each of the first and second work routes is the straight route R1, and the non-work route is the turn route R2, but the present invention is not limited to this.

Other Embodiments

The present invention is not limited to the above-described embodiment. Other embodiments of the present invention will be described below.

In the embodiment described above, the vehicle controller 11 sets the traveling speed on the partial route R1*a* connecting to the turn route R2 to the same speed (e.g., "3 km/h") as the traveling speed on the turn route R2. According to this configuration, the processing load of the vehicle controller 11 can be reduced because there is no need to switch the traveling speed after the turn is ended. However, the present invention is not limited to this configuration, and as another embodiment, the vehicle controller 11 may set the traveling speed on the partial route R1*a* to be faster than the traveling speed on the turn route R2 and lower than the traveling speed on the straight route R1.

For example, the vehicle controller 11 may set the traveling speed on the partial route R1*a* to a speed greater than 3 km/h and less than 7 km/h (e.g., "5 km/h").

Thus, in the present invention, the traveling speed on the partial route R1*a* (third traveling speed) is set higher than or equal to the traveling speed on the turn route R2 (second traveling speed) and less than the traveling speed on the straight route R1 (first traveling speed). The present invention is not limited to this, and the traveling speed on the partial route R1*a* (third traveling speed) may be less than the traveling speed on the turn route R2 (second traveling speed).

As another embodiment, the operation controller 21 of the operation terminal 20, in the operation screen D3 (see FIG. 7), may set an acceptable range of the vehicle speed (traveling speed on partial route R1*a*) after the end of turn. For example, the operation controller 21 sets the acceptable range to a range between more than or equal to the vehicle speed (3 km/h) at turning and less than the vehicle speed (7 km/h) at working. This prevents the human operator from inputting any wrong traveling speed.

As another embodiment, the operation controller 21 may cause the set column K4 of the operation screen D3 to pre-input (display) an initial value (default value).

For example, the operation controller 21 causes the set column K4 to display the vehicle speed for turning (traveling speed on turn route R2).

For example, the operation controller 21 may, based on the work instrument information about the work instrument 14 (type, size, weight, etc. of the work instrument), set the vehicle speed after the end of the turn (partial route R1*a*). For example, in the work instrument 14, the time required for the cultivating tines to move from the uppermost to the lowermost position varies depending on the type, size, and weight of the work instrument. Therefore, the operation controller 21, based on the work instrument information (work instrument type, size, weight, etc.) entered on the operation screen D2 in FIG. 6, sets the traveling speed at which the work instrument 14 can move from the uppermost position to the lowermost position while the work vehicle 10 travels the set distance L1.

For example, the operation controller 21 may, based on the work instrument information about the work instrument 14 (type, size, weight, etc. of the work instrument), set the vehicle speed distance after the end of the turn (set distance L1 of partial route R1*a*).

Figure 10A:
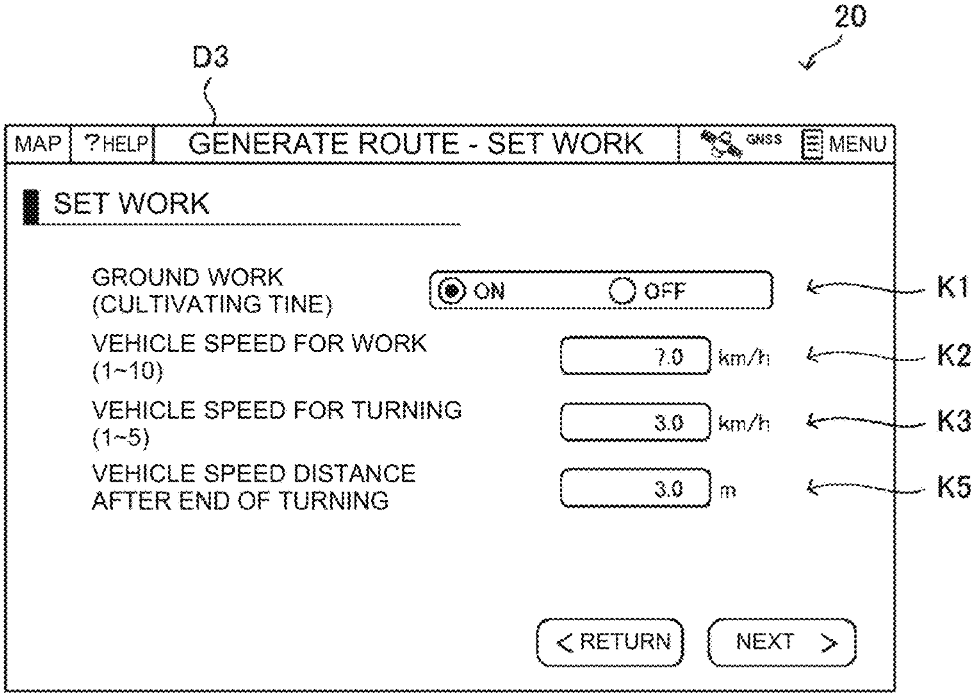
FIG. 10A is a diagram illustrating an example of an operation screen displayed on the operation terminal according to the embodiment of the present invention.

In the embodiment described above, the operation controller 21 is so configured as to receive, on the operation screen D3 (see FIG. 7), from the human operator, an operation to register the vehicle speed after the end of the turn (set column K4) and the vehicle speed distance after the end of the turn (set column K5); in the other embodiment, however, the operation controller 21 may have a configuration where the set column K4 is omitted and the vehicle speed distance after the end of the turn (set column K5) is registered (see FIG. 10A). In this configuration, the operation controller 21 may pre-set the vehicle speed after the end of the turn (e.g., set to the vehicle speed at the time of the turn).

Also, as another embodiment, the operation controller 21 may be so configured that, on the operation screen D3 (see FIG. 7), the set column K5 for setting the vehicle speed distance after the end of the turn (set distance L1 of partial route R1*a*) is omitted. In this configuration, the operation controller 21 pre-sets the vehicle speed distance after the end of the turn.

Figure 10B:
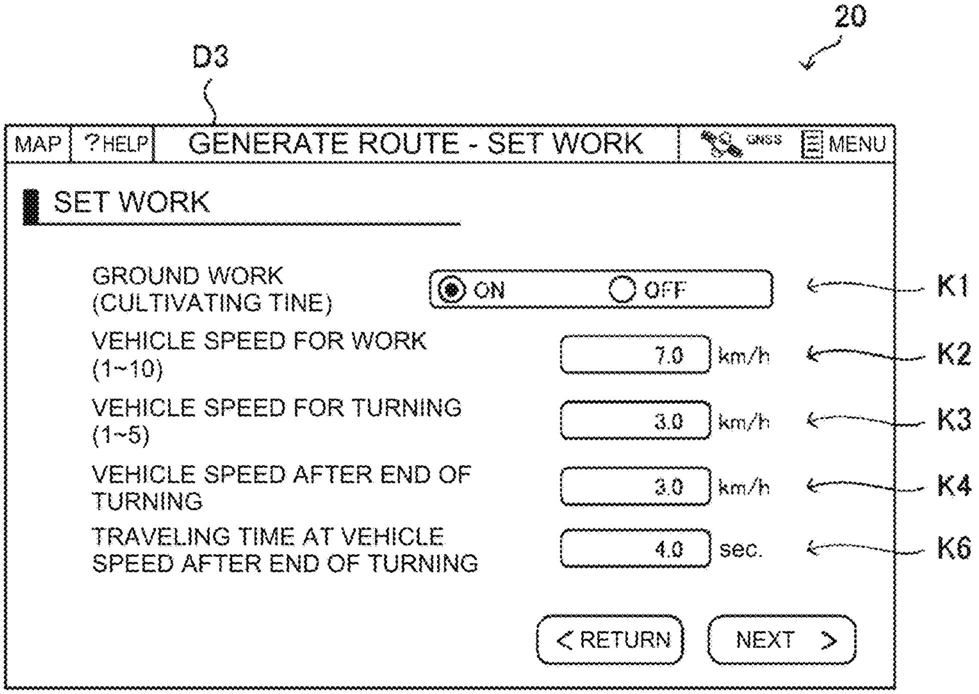
FIG. 10B is a diagram illustrating an example of the operation screen displayed on the operation terminal according to the embodiment of the present invention.

As another embodiment, the operation controller 21 may be configured to receive an operation to register the traveling time (predetermined time) for the work vehicle 10 to travel at the vehicle speed for turning (traveling speed on the turn route R2), after the end of the turn. As shown in FIG. 10B, for example, in the set column K6 of the operation screen D3, the human operator inputs the traveling time (e.g., "4 seconds") for the work vehicle 10 to travel at the vehicle speed, after the end of the turn. As a result, until the traveling time ("4 seconds") after the work vehicle 10 reaches the end position P2 has elapsed, the vehicle controller 11 causes the work vehicle 10 to travel at the vehicle speed for turning (traveling speed on the turn route R2). In this configuration, the set column K5 for setting the vehicle speed distance after the end of the turn (set distance L1 for partial route R1*a*) may be omitted.

In the embodiment described above, the vehicle controller 11, with the work vehicle 10 reaching the end position P2 (see FIG. 8), starts the posture change in the work instrument 14 from the non-working posture to the working posture. As another embodiment, before the work vehicle 10 reaching the end position P2, that is, during the work vehicle 10 traveling in the non-work route (turn route R2), the vehicle controller 11 may cause the work vehicle 10 to start the posture change in the work instrument 14 from the non-working posture to the working posture. With this, in the partial route R1*a*, the distance of the portion where the cultivating tines of the work instrument 14 do not reach the predetermined depth can be shortened. Lowering the work instrument 14 while the work vehicle 10 is traveling in a turning manner may fluctuate the center of gravity position of the work vehicle 10 thereby to deviate the work vehicle 10 from the target route R; therefore, the vehicle controller 11 may determine the timing to start lowering the work instrument 14, based on a turn radius of the turn route R2, the traveling speed on the turn route R2, the traveling speed on the partial route R1*a*, the work instrument information of the work instrument 14, etc.

In the embodiment described above, the cultivator has been described as an example of the work instrument 14, but the work instrument 14 is not limited to the cultivator and may be another agricultural instrument. For example, the work instrument 14 may be a spreader (sprayer) that sprays chemicals. The sprayer is in the working posture with a nozzle in the horizontally open position and in the non-working posture with the nozzle in the horizontally or vertically closed position.

REFERENCE SIGNS LIST

1: automatic traveling system
10: work vehicle
11: vehicle controller
14: work instrument
20: operation terminal
111: traveling processor (first traveling processor, second traveling processor, third traveling processor)
112: switching processor
211: vehicle setting processor
212: field setting processor
213: work setting processor
214: route generating processor
215: output processor
216: receiving processor
F: field (work area)
L1: set distance
P1: end position
P2: end position (connection position)
P3: predetermined position
P4: predetermined position
R: target route
R1: straight route (work route)
R1*a*: partial route (first partial route)
R1*b*: partial route (second partial route)
R1*c*: partial route (third partial route)
R2: turn route (non-work route)

The invention claimed is:

1. An automatic traveling method that causes a work vehicle to automatically travel, in a work area, according to a target route, the work vehicle being equipped with a work instrument capable of switching between a working posture in which a predetermined work is performed, and a non-working posture in which the predetermined work is not performed, the method comprising:

in a first work route included in the target route, setting the work instrument to the working posture, and causing the work vehicle to travel at a first traveling speed;

in a non-work route connecting to the first work route included in the target route, setting the work instrument to the non-working posture, and causing the work vehicle to travel at a second traveling speed lower than the first traveling speed; and of a second work route connecting to the non-work route included in the target route, in a first partial route from a connection position of the non-work route and the second work route to a predetermined position, causing the work instrument to change from the non-working posture to the working posture, and causing the work vehicle to travel at a third traveling speed lower than the first traveling speed.

2. The automatic traveling method according to claim 1, wherein in the first partial route of the second work route, the work vehicle is caused to travel at a constant traveling speed of the third traveling speed, in a second partial route following the first partial route of the second work route, the work vehicle is caused to travel under acceleration from the third traveling speed to the first traveling speed, and in a third partial route following the second partial route of the second work route, the work vehicle is caused to travel at a constant traveling speed of the first traveling speed.

3. The automatic traveling method according to claim 1, wherein the predetermined position is set in a position away from the connection position by a set distance that is preset.

4. The automatic traveling method according to claim 3, further comprising:

receiving, from a user, an operation to set the third traveling speed and the set distance.

5. The automatic traveling method according to claim 1, wherein the work vehicle is caused to travel at the third traveling speed until a predetermined time elapses after the work vehicle reaches the connection position.

6. The automatic traveling method according to claim 1, further comprising:

receiving, from a user, an operation to set the third traveling speed.

7. The automatic traveling method according to claim 1, wherein the third traveling speed is set based on work instrument information on the work instrument.

8. The automatic traveling method according to claim 1, wherein the third traveling speed is set at more than or equal to the second traveling speed.

9. The automatic traveling method according to claim 1, wherein when the work vehicle reaches the connection position, a posture change from the non-working posture to the working posture is started in the work instrument.

10. The automatic traveling method according to claim 1, wherein each of the first and second work routes is a straight route, and the non-work route is a turn route.

11. An automatic traveling system that causes a work vehicle to automatically travel, in a work area, according to a target route, the work vehicle being equipped with a work instrument capable of switching between a working posture in which a predetermined work is performed, and a non-working posture in which the predetermined work is not performed, the system comprising:

a first traveling processor that, in a first work route included in the target route, setting the work instrument to the working posture, and causing the work vehicle to travel at a first traveling speed;

a second traveling processor that, in a non-work route connecting to the first work route included in the target route, setting the work instrument to the non-working posture, and causing the work vehicle to travel at a second traveling speed lower than the first traveling speed; and a third traveling processor that, of a second work route connecting to the nonwork route included in the target route, in a first partial route from a connection position of the non-work route and the second work route to a predetermined position, causing the work instrument to change from the non-working posture to the working posture, and causing the work vehicle to travel at a third traveling speed lower than the first traveling speed.

12. A computer-readable non-transitory medium having thereon an automatic traveling program that causes a work vehicle to automatically travel, in a work area, according to a target route, the work vehicle being equipped with a work instrument capable of switching between a working posture in which a predetermined work is performed, and a non-working posture in which the predetermined work is not performed, the program causing one or a plurality of processors to execute an operation that comprises:

in a first work route included in the target route, setting the work instrument to the working posture, and causing the work vehicle to travel at a first traveling speed;

in a non-work route connecting to the first work route included in the target route, setting the work instrument to the non-working posture, and causing the work vehicle to travel at a second traveling speed lower than the first traveling speed; and of a second work route connecting to the non-work route included in the target route, in a first partial route from a connection position of the non-work route and the second work route to a predetermined position, causing the work instrument to change from the non-working posture to the working posture, and causing the work vehicle to travel at a third traveling speed lower than the first traveling speed.

* * * * *